L. M. STOOPS.
Bee Hive.
No. 83,565.
Patented Oct. 27, 1868.
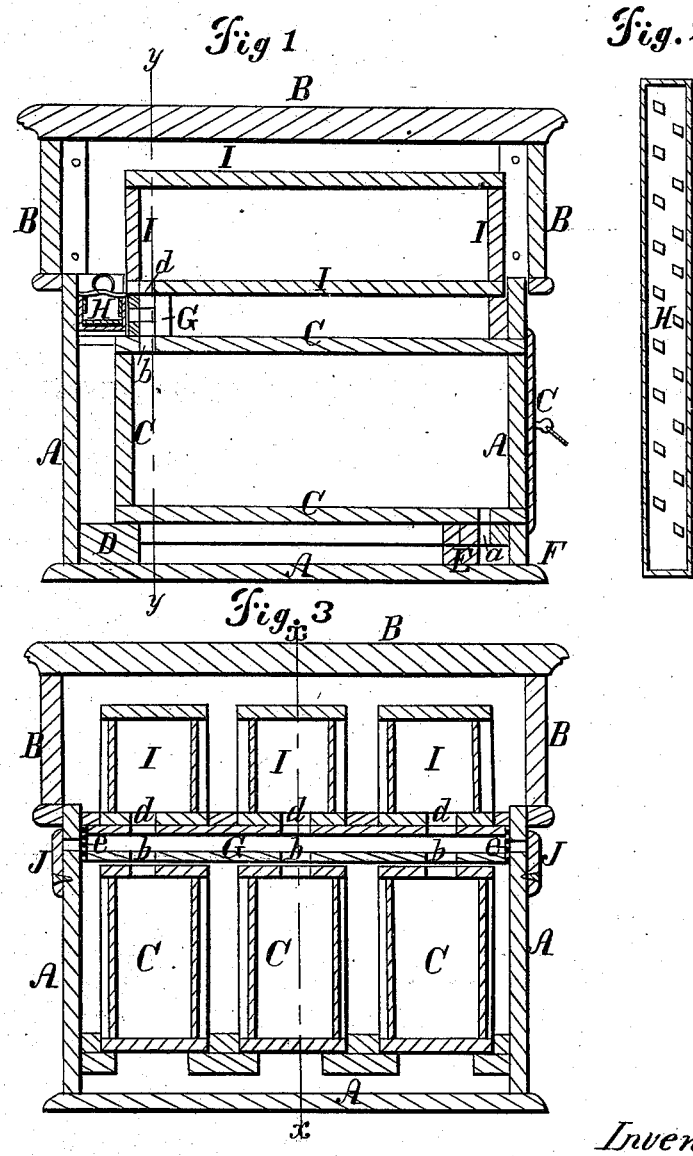

United States Patent Office.

L. M. STOOPS, OF GRANDVIEW, INDIANA.

Letters Patent No. 83,565, dated October 27, 1868.

IMPROVEMENT IN BEE-HIVES.

The Schedule referred to in these Letters Patent and making part of the same.

*To all whom it may concern:*

Be it known that I, L. M. STOOPS, of Grandview, in the county of Spencer, and in the State of Indiana, have invented certain new and useful Improvements in Bee-Hive; and do hereby declare that the following is a full, clear, and exact description thereof, reference being had to the accompanying drawings, and to the letters of reference marked thereon.

The nature of my invention consists in the construction and general arrangement of a bee-hive, which is perfectly moth-proof, as will be hereinafter more fully set forth.

In order to enable others skilled in the art to which my invention appertains, to make and use the same, I will now proceed to describe its construction and operation, referring to the annexed drawings, which form a part of this specification, and in which—

Figure 1 is a side section, through the line $xx$, fig. 2;

Figure 2 is a sectional front view, through the line $y\ y$, fig. 1; and

Figure 3, a plan view of the float in the feed-box.

A represents the body of the hive, which may be made of any material and dimensions desired; B is the cap, placed on top of the body A, and completely covering the same.

The brood-chambers C C are inserted into the hive from the front side, as shown, and can be easily withdrawn. These chambers rest on a block, D, in the rear of the hive, and on a hollow block or tube, E, in the front part. The entrance, F, is beneath the brood-chambers, and leads into the tube E, which extends across the hive, and is provided on its upper side with openings, $a$, which correspond with a similar opening on the bottom or lower side on each of the brood-chambers, as shown in fig. 1.

Over the inner or rear end of the brood-chambers is a similar hollow block or tube, G, for ventilating-purposes, which also extends the whole width of the hive, and openings, $b$, lead from each of the chambers into said tube.

This ventilating-tube, G, is, however, so arranged that it leaves a space between it and the rear side of the hive, in which space the feed-box H is placed. An opening, $c$, leads from the tube to said feed-box, which opening may be closed by a slide placed on the rear side of the tube.

The honey-boxes I I are placed in the upper part of the hive, and rest at the rear end on the tube G, openings, $d$, leading from the same into the boxes.

On each side of the hive is an opening, $e$, leading into the end of the ventilating-tube G, which openings are covered on the inner side with wire gauze, and provided with a slide, J, on the outside, so that they may be closed or opened, as may be desired.

The chambers, as well as the honey-boxes, are provided with glass on their sides, and as they are so arranged that there is a space between each of them, and between them and the hive, they can easily be removed without interfering with each other.

The air, entering through the entrance F, and the openings $e\ e$, into the ventilating-tube G, gives perfect ventilation of all the chambers and boxes.

This hive is perfectly moth-proof, as it will be seen there is only one entrance for them to enter, namely, the bee-entrance F, from whence they pass into the tube E, and cannot get into the brood-chambers, especially as this tube is in constant use, the bees passing at all times through the same, and destroying them.

Bees can be safely wintered in this hive by removing the cap, B, and filling the space between the chambers with sawdust, or any other suitable material, and then replacing the cap; the filling to be removed early in the spring.

Having thus fully described my invention,

What I claim as new, and desire to secure by Letters Patent, is—

1. The perforated tube E, placed in the bottom of the hive, at its front side, and provided with the entrance F, all substantially as shown and described.

2. The ventilating-tube G, provided with openings to admit air through the sides of the hive, and other openings leading into the brood-chambers and honey-boxes, substantially as herein set forth.

3. The arrangement of the brood-chambers C C, ventilating-tube G, feed-box H, and honey-boxes I I, all constructed substantially as and for the purposes herein set forth.

In testimony that I claim the foregoing, I have hereunto set my hand, this 13th day of July, 1868.

L. M. STOOPS.

Witnesses:
 MILO E. LAURANCE,
 CHAS. L. EVERT.